UNITED STATES PATENT OFFICE.

CHARLES HERENDEEN, OF CHICAGO, ILLINOIS.

PROCESS OF PRODUCING FLOUR OR MEAL.

1,002,990.　　　　Specification of Letters Patent.　　Patented Sept. 12, 1911.

No Drawing.　　Application filed June 20, 1910.　Serial No. 567,846.

*To all whom it may concern:*

Be it known that I, CHARLES HERENDEEN, a citizen of the United States, residing at Chicago, in the county of Cook and State of Illinois, have invented certain new and useful Improvements in Processes of Producing Flour or Meal, of which the following is a specification.

My invention relates to an improved process of making flour or meal.

In Patent No. 958,494, dated May 17, 1910, I describe a process of making flour in which, among other steps, is described the subjecting of grits or meal to the action of steam for a sufficient period to disrupt the starch cells therein, and then passing the resulting product through rolls to flake the same, and the object of my present invention is the simplification of the process described in my said patent and the elimination of certain steps recited therein, thereby effecting a material saving in cost and an economy in time in the production of the desired product.

By my present process I produce a flour which is capable of absorbing and holding moisture in a degree greater than that of flour which is prepared in the ordinary manner, and a flour which will produce products such as bread and pastry, and other products of food which will retain their freshness for a longer period than those made from flour prepared in the usual or ordinary manner.

Wheat flour prepared in the usual manner is capable of absorbing moisture only to an extent of about seventy-five per cent. of its own weight. Flour prepared according to my method will absorb moisture from two to six times its own weight, and by using a mixture of flour prepared according to my method and flour prepared in the ordinary manner I produce a product capable of absorbing the required degree of moisture and a product from which bread can be made having the superior characteristics hereinbefore enumerated.

In addition to the superior quality of the bread made from my product when combined as stated with flour prepared according to the ordinary method, a larger amount of bread can be made from a given quantity of flour. Also my product can be used in other food in which flour is generally used, making the articles of food more palatable and nourishing.

In the practice of my process I utilize grits, meal, flour, or other form of starch-containing products, which I subject to the action of steam or hot air for a sufficient period to disrupt the starch cells therein. The period of time to which the material is subjected to the action of the heat may be varied according to the quantity of the material being subjected thereto, but to subject the material to the action of the heat for a sufficient period to disrupt the starch cells therein. Where the material is subjected to the action of steam, I have found that such period need not exceed thirty seconds of time, the steam pressure at the boiler being about one hundred and ten pounds. Where hot air is employed as the starch-disrupting medium I first moisten the mass of material before subjecting it to the action of hot air. I then subject the material so treated to an air blast or through suitable driers dry the same. I then pass the material to grinders where it is ground into flour of any desired degree of fineness. The flour thus produced is then added in proportioned degree with ordinary wheat, graham, rye or other flour prepared in the ordinary manner and in the proportions desired. The flour resulting from the blending of flour produced by my process herein described with ordinary flour possesses a high degree of moisture absorbing and retaining properties, and the bread, cakes, or articles of food made therefrom are consequently more palatable and nourishing as food, and will retain their freshness for a longer period. A further advantage consists in the fact that in the use of the flour described herein a material saving is effected in the amount of yeast, shortening and sweetening materials usually employed in the making of bread and pastry products.

In the practice of my improved process I eliminate the step of passing the material through rolls to flake the same after the disruption of the starch cells therein, thus obtaining the desired product in a more economical and expeditious manner.

Having thus described my invention what

I claim as new and desire to secure by Letters Patent is:

The process of making flour or meal from starch-containing cereals, which consists in injecting steam into such material for a sufficient period of time to disrupt the starch-cells thereof, passing the resultant product through blasts of air to dry the same, and then passing the product into grinders for the purpose of producing a finished flour or meal of any fineness.

In testimony whereof I affix my signature in presence of two witnesses.

CHARLES HERENDEEN.

Witnesses:
HARRY C. HERENDEEN,
LILLIAN PARKHURST.